UNITED STATES PATENT OFFICE.

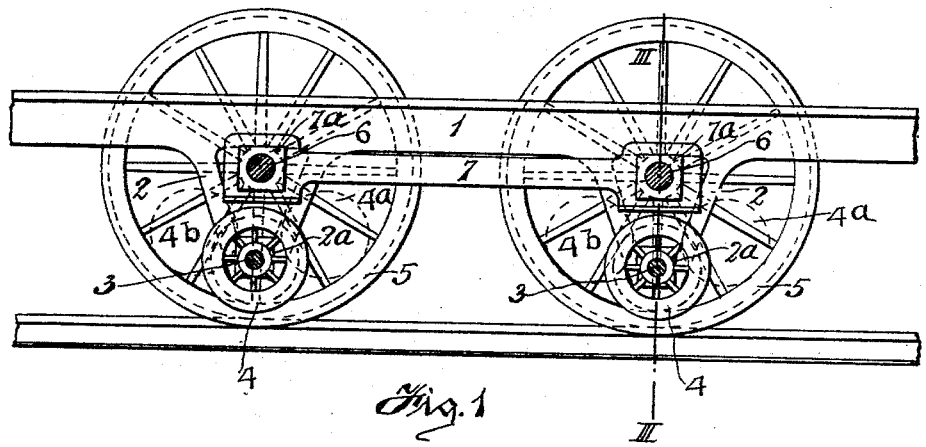

OLOF ANDERSON, OF BRADDOCK, PENNSYLVANIA.

DUPLEX POWER-TRUCK.

SPECIFICATION forming part of Letters Patent No. 584,031, dated June 8, 1897.

Application filed February 17, 1897. Serial No. 623,791. (No model.)

*To all whom it may concern:*

Be it known that I, OLOF ANDERSON, a citizen of the United States, residing at Braddock, in the county of Allegheny and State of Pennsylvania, have invented or discovered new and useful Improvements in Duplex Power-Trucks, of which the following is a specification.

In the accompanying drawings, which make part of this specification, Figure 1 is a longitudinal section. Fig. 2 is a plan view of the same, and Fig. 3 is a section along the line 3 3 in Fig. 1.

My invention, generally stated, consists of a truck mounted on pairs of small wheels which run on the inner rims of corresponding pairs of larger wheels, the pairs of large wheels being yoked together and power being applied to both large and small wheels.

The following is a detailed description of my invention:

1 is an ordinary truck-frame supported by horn-blocks 2 2, having oil-boxes $2^a$ $2^a$, in which are journaled the axles 3 3 of small wheels 4 4. Wheels 4 4 have the usual flanged rim which engages the inner rims of the larger wheels 5 5. The distance between inner rim and hub of wheels 5 5 is great enough to clear small wheels 4 4. Large wheels 5 5 are mounted on axles 6 6, which axles are yoked together by coupling-bars 7 7, fitted with oil-boxes $7^a$ $7^a$. The horn-blocks 2 2 are fitted to pass around axles 6 6, allowing them great play, as in the operation of the device the small wheels 4 4 change their positions on the rims of large wheels 5 5.

8 8 are the gears by which the axles of wheels 5 5 are connected to the motor or other source of power.

9 9 are the corresponding gears, by which power is transmitted to small wheels 4 4. Owing to the mutual change of position occurring between wheels 4 4 and wheels 5 5, it is evident that they could not conveniently receive their power from the same source.

Any other known means of transmission of power may be substituted for gears 8 8 and 9 9, such as eccentric and crank, belting, &c.

The operation of my device is as follows: The truck standing as in Fig. 1, power is applied to both the large wheels 5 5 and small wheels 4 4. In revolving, supposing the truck to be advancing from left to right, the smaller wheels 4 4 would tend to assume the position shown by the dotted wheels $4^a$ $4^a$, raising the truck-frame and advancing it slightly. This, of course, coupled with the impetus caused by the friction between wheels 4 4 and wheels 5 5, would tend to assist the revolution of the large wheels 5 5, to which power has also been applied. When it is desired to stop the truck, the small wheels 4 4, having had the power removed therefrom, will tend to lag and back up along the large wheels 5 5, assuming some such a position as shown in the dotted wheels $4^b$ $4^b$, thus effectually acting as a load to retard the forward revolution of the large wheels 5 5.

The benefits accruing from my device are as follows: A car fitted with my invention can be started from a position of rest in a much shorter time and attain a higher rate of speed in a less distance than possible with any other known means, and the stoppage of the same can also be effected in a much shorter time and with greater ease.

Having described my invention, what I claim is—

1. In power-trucks; the combination of small wheels; large wheels on whose inner rims said small wheels are fitted to run, and means for applying power to both large and small wheels.

2. In power-trucks; the combination of a truck-frame; small wheels supporting said truck-frame; larger wheels on whose inner rims said small wheels are fitted to run and means for applying power to both large and small wheels.

3. In power-trucks; the combination of a truck-frame; horn-blocks fitted to said truck-frame; small wheels mounted on axles journaled in said horn-blocks; large wheels on whose inner rims said small wheels are fitted to run; coupling-bars in which are journaled the axles of said large wheels and means for applying power to said large and small wheels.

In testimony whereof I have hereunto set my hand this 20th day of January, A. D. 1897.

OLOF ANDERSON.

Witnesses:
EDWARD A. LAURENCE,
MARSHALL H. RENO.